United States Patent [19]
Babcock

[11] 3,890,157
[45] *June 17, 1975

[54] CEMENTITIOUS SYSTEMS INCORPORATING PARTICULATE ADSORBENTS

[76] Inventor: Henry Nash Babcock, 4 Quintard Ave., Old Greenwich, Conn. 06870

[ * ] Notice: The portion of the term of this patent subsequent to Feb. 26, 1991, has been disclaimed.

[22] Filed: July 24, 1974

[21] Appl. No.: 491,317

Related U.S. Application Data

[60] Continuation-in-part of Ser. No. 328,498, Jan. 31, 1973, abandoned, which is a continuation-in-part of Ser. Nos. 303,984, Nov. 6, 1972, abandoned, and Ser. No. 709,229, Feb. 29, 1968, abandoned, said Ser. No. 303,984, is a division of Ser. No. 801,781, Feb. 24, 1969, Pat. No. 3,794,504.

[52] U.S. Cl. .................. 106/89; 106/97; 106/98; 106/110; 106/118
[51] Int. Cl.² ... C04B 1/00; C04B 7/02; C04B 11/00
[58] Field of Search ............... 106/86–89, 106/97, 98, 314, 315, 110, 118

[56] References Cited
UNITED STATES PATENTS

| | | | |
|---|---|---|---|
| 1,901,056 | 3/1933 | Randel | 106/89 |
| 1,923,370 | 8/1933 | Hansen | 106/89 |
| 2,609,882 | 9/1952 | Morgan et al. | 106/97 |
| 3,234,035 | 2/1966 | Small et al. | 106/89 |
| 3,503,767 | 3/1970 | Gaines et al. | 106/89 |
| 3,519,449 | 7/1970 | Babcock | 106/89 |
| 3,582,376 | 6/1971 | Ames | 106/110 |
| 3,794,504 | 2/1974 | Babcock | 106/87 |

*Primary Examiner*—J. Poer
*Attorney, Agent, or Firm*—Howard M. Bollinger; Alphonse R. Noe

[57] ABSTRACT

The shrinkage of aqueous hydraulic cement mixtures is eliminated by incorporating therein a porous particulate material, such as an adsorbent such as activated alumina, activated bauxite, activated silica gel, and activated carbon. The particulate adsorbent material has a volume of entrapped gas and is capable of releasing at least a major portion of such gas during setting and early hardening of the cement mixture while in contact with water. The adsorbent gas release is fairly rapid making it particularly advantageous for fast setting cementitious compositions.

14 Claims, No Drawings

CEMENTITIOUS SYSTEMS INCORPORATING PARTICULATE ADSORBENTS

This application is a continuation-in-part application of my copending application, Serial No. 328,498 filed January 31, 1973 which is a continuation-in-part of my application copending with it, Serial No. 709,229 filed February 29, 1968, both now abandoned, and of my copending application, Ser. No. 303,984 filed November 6, 1972, and now abandoned, as a divisional application of my application copending with it, Ser. No. 801,781 filed February 24, 1969, now Patent No. 3,794,504 issued February 26, 1974.

BACKGROUND OF THE INVENTION

1. Field of the Invention

This invention relates to improvements in cementitious systems and more particularly to an improved method and composition for inhibiting shrinkage of such systems during setting and early hardening.

The term "cementitious systems," as used herein, is intended to include compositions which generally possess the characteristic of hardening under water and includes, for example, settable hydraulic cement, hydraulic lime, gypsum, and like materials, as well as mixtures of the foregoing with aggregate and water such as concrete, mortar, grout and products made therefrom.

2. Description of the Prior Art

Methods and means for inhibiting shrinkage of settable hydraulic cement mixtures during setting and early hardening have been previously suggested. The prior art methods have included the addition, to such mixtures, of various expansion agents, such as aluminum powder and iron filings, which are generally added at the mixing during the preparation of the cement mixture.

The use of aluminum powder to prevent shrinkage, however, is impractical because its addition must be attended with carefully controlled conditions. This is because the aluminum powder causes liberation of hydrogen gas at a rate which is a function of the amount used and particle size, as well as the cement composition. The use of iron filings is also accompanied with many shortcomings due to lack of control over the expansion which continues long after the desired effect of shrinkage retention has been achieved. Moreover, iron filings result in a temporary shrinkage which occurs before sufficient oxidation takes place to initiate internal expansion.

In recent years, I have discovered that certain unique materials can eliminate shrinkage in concrete. Materials such as fluid coke and a combination of fluid coke and delayed coke, which are by-products of the petroleum industry, can be used with various types of cementitious mixtures to eliminate shrinkage. See, for example, U.S. Pat. Nos. 3,503,767, 3,519,449, and Re. 26,597. The availability of fluid coke, however, is dependent on the continuous operation of fluid coking plants and economic factors competing for the supply of this material. Hence, alternatives to the utilization of fluid coke to inhibit shrinkage of cementitious systems are desirable.

Certain cementitious systems are fast setting in comparison to others. That is, the time period required for a cementitious material-water composition to stiffen and to become hard may vary with the material. Both initial set, referring to the first stiffening, and final set, referring to a hardening of the mass may vary. While a material, such as gypsum or a retarder such as sodium citrate may be added to a material such as cement to retard the set, it is frequently desirable in certain applications to have a quick setting material. Such a quick setting cementitious system still undergoes shrinkage and desirably there must be utilized a shrinkage inhibition means specific to such fast setting system.

SUMMARY OF THE INVENTION

I have now discovered that the shrinkage normally associated with the setting and early hardening of fast setting cementitious systems may be effectively inhibited by incorporating in the hydraulic cementitious mixture an admixture, that is, an additive, comprising a particulate solid adsorbent material having surface properties for preferential adsorption of water and for discharging gas entrapped therein. I have also found that control in inhibiting shrinkage of cementitious systems with various quick setting times may be obtained through selection of an adsorbent since a wide variety of advantageous surface properties are available. The adsorbent is added to the cement mixture at a time prior to the addition of water thereto and discharges its entrapped gas during setting and early hardening of the cement mixture while in contact with water.

The adsorbents that may be advantageously utilized in this invention include silica gel, activated alumina, activated bauxite, and activated carbon. Industrial adsorbents generally have a surface area of 700 to 1,000 $m^2/g$. In contrast, a nitrogen test seeking to evaluate fluid coke as an adsorbent has shown a surface area of approximately only $20 m^2/g$. Additionally, the pore volume of adsorbents is nearly 40 times that of fluid coke. Thus, fluid coke is not an adsorbent; nor is delayed coke. Furthermore, fluid coke differs from so-called industrial adsorbents in other aspects of physical structure. While an adsorbent may be simply considered as having a sponge-like structure, fluid coke has a hard spherical onion or hailstone-like structure.

Fluid coke is a by-product of the fluid coking process for the thermal conversion of heavy hydrocarbon oils to lighter fractions. The seed coke which is used as a catalyst in a fluidized bed reactor is initially heated in a burner vessel and is then fed into the reactor where the coke comes in contact with raw preheated feed stock. The feed stock, upon contact with the coke particles, is partially cracked and the lighter fractions are flashed off. Additional coke is formed, both as seed coke and in the growth of the heated coke particles coming from the burner vessel. The new coke is deposited on the seed coke in onion-like uniform layers. The excess coke thus formed in the reactor is tapped off and quenched and constitutes fluid coke, Adsorbents of this invention release their entrapped gas much faster than does fluid coke under the same operating conditions and thus they are particularly advantageous in fast setting cementitious systems. Cement Types I, II, IV and V are considered cements which set in regular time. Type III cement is normally fast setting and sets generally in ninety minutes or less. Therefore, by fast setting cementitious systems is meant those that set in less than ninety minutes and especially those setting within sixty minutes. Such cementitious systems may include cements with accelerators, chlorides, gypsums, calcined gypsums and the like, since the adsorbents used in the method and composition of this invention are capable of releasing entrapped gas according to this invention in times as fast as 1 to 30 minutes.

Thus, it is an object of this invention to inhibit the shrinkage that occurs with the setting and early hardening of fast setting cementitious systems.

The resultant aqueous hydraulic cement mixture of the present invention has better workability, for example, it requires 5% to 10% less water, and the product prepared therefrom has greater strength than comparable prior art cementitious systems. As a consequence of the better workability and higher strength of the product, the cement mixture of this invention requires essentially less cement. Furthermore, by selecting the proper adsorbent, the amount of expansion and contraction of the cementitious system can be much more effectively regulated by the method of this invention. The product prepared from the cement mixture of this invention shows remarkable freeze-thaw resistance, even in salt water, and superior bonding and pull-out strengths. These unique properties, in combination with the non-shrinking characteristic and yet without the inherent disadvantages of the prior art cementitious systems, render the cementitious system of this invention particularly attractive to construction and other related cement-using industries.

Therefore, a further object of this invention is the provision of a fast-setting cementitious composition having particular advantages for use in the construction industries.

DESCRIPTION OF THE PREFERRED EMBODIMENTS

The particulate material suitable for this invention generally has a porous structure with open cells for entrapping a large volume of gas which is releasable to the cementitious system during setting and early hardening when liquid such as water in the cementitious mixture is being adsorbed by the particulate material. Broadly construed, the suitable particulate materials may be considered as solid adsorbents with a high degree of selectivity for water, moisture or other liquid adsorption. However, it is understood that the particulate materials suitable for this invention may or may not be considered by others or used in the industry as solid adsorbents. Moreover, the fact that a material may be considered an adsorbent or used as such by others for adsorptive functions does not necessarily render it usuable herein since it must possess a quality of entrapped gas, capable of being released, according to this invention.

Thus, an adsorbent such as activated carbon is not usuable herein in its common for desirable for normal adsorption functions because in such form it is preferably wetted to eliminate dust problems when handling and to facilitate immersion in liquids to be treated. In fact, it is considered desirable to predisplace any adsorbed gas by moisturizing to accelerate the rate of wetting in normal use. Moisture does not impair the normal adsorptive capacity and activated carbons have been stored in water for years without any impairment. See Hassler, John, W., "Activated Carbon" Chemical Publishing Company., New York, N.Y. (1963).

The effective particulate material or adsorbent for eliminating the shrinkage of fast setting cementitious systems according to this invention should have a sufficient volume of releasable entrapped gas so that shrinkage is inhibited. Desirably, this volume is large so that relatively small amounts of this shrinkage preventive additive have to be used to offset the contracted volume in a cementitious system during fast setting and early hardening.

The major types of adsorbents that may be used in this invention include activated alumina, bauxite, aluminosilicate, bone char, wood char, activated carbon, magnesia, silica gel, and magnesium silicate. Whether or not the adsorbents are termed activated is immaterial provided that they possess the characteristics described herein. Some of these adsorbents may need to be treated to make them suitable for controlling the shrinkage of the cementitious system if they do not contain a volume of entrapped gas due to moisture content. The treatment generally involves simply drying the additive to reduce the moisture content therein to below about 3% by weight. The aforesaid adsorbents are available commerically in a variety of grades and particle sizes and may have low moisture content so that further treatment is not required. Although the size of these adsorbents is not critical, I advantageously use adsorbents with a majority of the particles below about 30 mesh and more preferably below about 50 mesh. Within the size range selected, these adsorbents will provide a sufficiently fast release rate so that a major portion of the entrapped gas will be released while the fast setting cementitious system is still in a plastic state.

The amount of the additive of this invention to be used depends on the shrinkage characteristics of the particular cementitious system and also, to a large extent, the amount of evaporation taking place and other physical properties of the particular adsorbent. I found that the amount of particulate material added to the cementitious system is advantageously maintained below 10%, by weight, of the cement in the system in order to maintain good workability and high strength. In general, the adsorbent should advantageously have an internal porosity in excess of 25% and an external void fraction above about 35%. The particulate material should be sufficiently small to provide a surface area in excess of about 100 $m^2/g$. These properties make the material particularly suitable for fast gas release for example, as fast as a few minutes to one hour, and thus particularly advantageous for fast setting cementitious systems.

While the exact nature why certain particulate materials can be used effectively to eliminate the shrinkage in cementitious systems is not completely understood, it is believed that the suitable particulate materials have in general certain surface properties which preferentially adsorb water to cause the discharge of the gas initially entrapped in the material either by a simple displacement action or by a combination of displacement and capillary actions due to the change of environment conditions during the setting and early hardening of the cementitious system. The discharged gas offsets the contraction within the cementitious system. The entrapped gas will be that which has surrounded the adsorbent and may be a relatively inert gas such as air, nitrogen and the like since the gas preferably does not participate in a chemical reaction in the cementitious system. Thus, there is no chemical reaction with the cementitious system nor the adsorption of a chemical therein. The particulate material itself may be inert to the system.

I found it possible to control the speed of gas release and the size of the gas bubbles by controlling the size and selecting the surface properties of the particulate materials. Generally, the particulate material with smaller cells will release smaller bubbles at a slower rate and conversely the material with larger cells will release larger bubbles at a faster rate. For a highly porous material, reduction of particle size will increase the number of open cells, hence improving the gas entrapping and releasing efficiency of the material for inhibiting the shrinkage of the cementitious system. As will be apparent from the subsequent discussion, due to the differences in the surface properties and particle sizes, addition of one or a mixture of adsorbents with a substantially uniform or a selected range of particle sizes will provide a controlled release of the entrapped gas over an extended period during setting and early hardening of the cementitious system for various purposes inhibiting the shrinkage thereof. It will be understood by those skilled in the art that the selection of specific adsorbents, surface properties and particle sizes will be dependent upon the cementitious system used and the application desired. The proper selection can be readily made based on routine observation and measurement of those parameters described herein.

In carrying out the method of this invention, the proper amount of particulate material may be added to and mixed with cement or any type of cement mixture at any time prior to or during the addition of water to form aqueous cement mixtures. For example, in preparing grout or mortar, the additive may be mixed with cement or cement and fine aggregates to form a dry cement mixture which is subsequently mixed with the desired amount of water to form grout or mortar. Similarly, in preparing ready-mixed concrete, the additive may be mixed with the cement and aggregates to form a dry mixture which is then used to form the ready-mixed concrete either in a stationary or in a truck mixer. On the other hand, it may be advantageous to mix all the ingredients, including the additive, in the stationary and/or in the truck mixer to form the ready-mixed concrete.

Since the amount of additive to be used in any cementitious system can be best calculated based on the amount of cement in the system, it is advantageous to incorporate the additive directly in the cement prior to its shipment to the user.

Further to illustrate this invention, specific examples are described hereinbelow. In these examples, the performance of the additive was judged by the expansion and contraction of the cementitious system as soon as it was mixed with water and cast in a cylindrical mold with approximately 10% of exposed surface. The expansion and contraction of the cast was determined by the vertical movement of the top surface. For the purpose of higher accuracy, a light test was used to measure the movement of the top surface. The test consists of using a focused light beam to project a shadow of the top surface onto a screen equipped with a vertical graduation. The manification is 72 times. The movement of the top surface on the screen is recorded every 10 to 20 minutes for each cast until final set, which usually takes about 3 to 4 hours with longer setting materials and less than 60 minutes with fast setting cementitious composition.

A thin layer of water was added to the mold for cast setting under "no evaporation" condition. To facilitate the detection of the movement of the top surface, a marble was placed on top of the surface and the expansion or contraction of the cast was determined by the movement of the apex of the shadow projected on the screen.

EXAMPLE 1

In this example, the no evaporation condition was used for setting a Portland Cement Paste prepared by mixing Allentown - Type III cement with water in a ratio of four gallons per sack of cement. Silica gel added thereto is activated and has a particle size in the range of 6 to 12 mesh. The results of the described light test on various casts using different amounts of silica gel is tabulated below:

Table 1

| % Silica | Volume Change After 3 Hours | Volume Change After 24 Hours (dry) |
|---|---|---|
| 0.1 | − 2.7 | − 2.2 |
| 0.3 | + 0.8 | + 0.75 |
| 0.5* | + 0.7 | − 0.1 |
| 1.0 | + 2.0 | + 1.3 |
| 1.0** | + 0.6 | 0.0 |

*-Some drying took place during this run which may account for the discrepancy between the runs with 0.3 and with 0.5% admixture.
**-The Gel was ground to 50–100 mesh.

EXAMPLE 2

A Portland cement paste similar to Example 1 was used in this example. The additives used were as follows:

A. Activate Bauxite (-60 Porocel SB-12-68 of Alcoa)
B. Silica Gel (Sorbead R of Davison-Grace)
C. Synthetic Bone Char (Kerr-McGee)
D. Activated Carbon (9LC-48/150 from Union Carbide)
E. Magnesia-Silica Gel (Florisil 60/100 mesh from FMC)

Only 1% by weight of cement of these additives were used.

The results of the light tests are tabulated in Table 2.

Table 2

| | Volume Change | |
|---|---|---|
| | After 3 Hours | After 24 Hours (dry) |
| A. | + 0.6 | + 0.8 |
| B. | + 0.6 | + 0.9 |
| C. | + 0.2 | + 0.25 |
| D. | + 0.1 | + 0.15 |
| E. | + 0.3 | + 0.13 |

In contrast to the above results, an aqueous sand-cement mixture prepared in the same manner as those used in the examples exhibited a negative volume charge, that is, shrinkage.

The foregoing discussion has particular relevance to particulate material capable of releasing comparatively large amounts of gas upon adsorption of water and includes the adsorbents described in use with cementitious systems having varied setting times. Additionally, I found that the adsorbents are particularly advantageously useful with fast setting cementitious system. For example, a hydraulic cement substantially devoid of gypsum has the following setting times with various amounts of gypsum added thereto and is of the type for which the invention is suitable.

Table I

| Percent of Gypsum | Water to Cement Ratio | Initial Set |
|---|---|---|
| 0.72% | 6:1 | 10 min. |
| 0.8% | 3.9:1 | 11 min. |
| 0.8% | 5:1 | 22 min. |
| 0.8% | 6:1 | 25 min. |
| 1.03% | 3.9:1 | 25 min. |
| 1.03% | 5:1 | 40 min. |
| 1.2% | 4.8:1 | 45 min. |
| 1.8% | 4.5:1 | 60+min. |

Pressure-calcined gypsum, also known as alpha gypsum, may be used in combination with hydraulic cement to make a fast setting cementitious composition. The pressure calcined gypsum may be of the type marketed by the United States Gypsum Company under the tradename of Hydro-Stone. The amount of pressure-calcined gypsum that may be used for preparing a fast composition may range within a wide range, 5% to 100%, by weight of the cement being suitable with 25% to 75% by weight of the cement being particularly advantageous.

The adsorbent-like porous particulate materials described herein may be advantageously used in cementitious compositions that include calcined gypsum. While the presence of the calcined gypsum aids in elimination of long-term shrinkage and thus the elimination of the cracking such causes, the adosrbent-like material results in shrinkage inhibition during fast setting.

The surprising effectiveness of the adsorbent-like porous particulate materials of this invention during the first few minutes of setting, that is, during fast setting is demonstrated in the following examples.

EXAMPLE 3

In this example, an Allentown-Type III cement was mixed with water in a proportion of 400 grams cement to 142 grams water and cast as described above. Identical mixes had respectively included in them various adsorbents as set forth below and were also cast as described above. The cast compositions were observed using the light test set forth above. The observations made at various times were recorded and are complied in Table 3. While the time observation made for specific materials vary within a matter of a few minutes such does not affect the trend shown. The adsorbent materials were added in the amount of 4 grams, approximately 1 percent, and are as follows:

F. Activated Silica Gel (Sorbead) (1.2 grams only added).
G. Activated Carbon-not dry (Westvaco Nuchar CEE-N).
H. Activated Carbon-dry (Union Carbide 9LC-48/150).
I. Activated Magnesia - Silica Gel (FMC Florisil 60/100).
J. Magnesia (FMC Seasorb 43).
K. Magnesia (FMC Seasorb 53).

Table 3

| Time After Casting (Minutes) | Control | Volume Change | | | | | |
|---|---|---|---|---|---|---|---|
| | | F. | G. | H. | I. | J. | K. |
| 0 | 0 | 0 | 0 | 0 | 0 | 0 | 0 |
| 10 | | | −1.0 | −0.1 | 0 | −0.15 | −0.2 |
| 15 | −1.0 | 0 | | | | | |
| 20 | | | −1.0 | −0.1 | 0 | −0.25 | −0.25 |
| 30 | −1.5 | +0.5 | | | | −0.3 | −0.15 |
| 40 | | | −1.1 | −0.15 | 0 | | |
| 45 | −1.5 | +0.5 | | | | −0.3 | −0.15 |
| 50 | −1.5 | +0.6 | | | | | |
| 60 | | | −1.1 | −0.15 | 0 | −0.3 | −0.1 |

The results set forth in Table 3 demonstrate that shrinkage may be inhibited during fast setting, even within the first 10 to 30 minutes of setting, according to this invention. In addition, it is seen that controlled shrinkage inhibition may be obtained through the addition of selected adsorbents. For example, the two types of magnesia show different values of shrinkage inhibition as do the differing adsorbents themselves. The activated carbon which was not dry did not work successfully as seen from Table 3. Particle size may also be varied for control, and the various mesh sizes are given thusly, 60/100.

EXAMPLE 4

An Allentown-Type III cement was mixed with water in the proportion of 400 grams cement to 142 grams water. Similar mixes, but containing, respectively, approximately 4 grams of aluminum powder (Grace-Darex) and 4 grams activated carbon were also prepared. The mixes were cast and observed using the light test, as described above. The results are set forth in Table 4.

Table 4

| Time After Casting Minutes | Volume Change | |
|---|---|---|
| | Aluminum Powder | Activated Carbon |
| 0 | 0 | 0 |
| 5 | +1.0 | |
| 10 | +7.5 | |
| 15 | — | 0 |
| 20 | +12.8 | +1.2 |
| 25 | +17.9 | +0.9 |
| 30 | +19.2 | +0.9 |
| 35 | +20.6 | +0.9 |
| 40 | +21.5 | +0.95 |
| 45 | +22.0 | +0.95 |
| 50 | +23.7 | +0.95 |
| 55 | +24.3 | +0.95 |
| 60+ | +25.6 | +0.95 |

The control exhibited a shrinkage during the above period of fast setting. The results show that an additive such as aluminum powder provides too rapid uncontrolled expansion within the first hour of setting by expanding the mix two fold in the period from 20 minutes to one hour. It also provides too great an expansion. By contrast, the activated carbon reaches a point of expansion that is sufficient to compensate for shrinkage and inhibits it and remains fairly constant thereafter.

I claim:

1. A cementitious composition which, when mixed with water, is capable of setting into a hard mass without substantial shrinkage during setting and early hardening, said composition comprising a hydraulic cement mixture and a dry adsorbent-like porous particulate solid material with an internal porosity in excess of 25 percent, an external void fraction above 35 percent and a surface area in excess of 100 m²/g, having a volume of entrapped gas within its pores and capable of preferentially adsorbing water and controllably discharging the entrapped gas during setting and early hardening of said cement mixture while in contact with water, in an amount effective to counteract the shrinkage tendency of the cementitious composition.

2. A cementitious composition as claimed in claim 1 further including pressure-calcined gypsum.

3. A cementitious composition as claimed in claim 1 where the hydraulic cement mixture is one which sets in less than about 90 minutes.

4. A cementitious composition as claimed in claim 1 wherein said particulate solid material is selected from the group consisting of activated alumina, activated bauxite, activated carbon, activated silica gel, alumino-silicate, bone char, magnesia, and magnesium silicate.

5. A cementitious composition as claimed in claim 4 wherein the particulate solid material has a moisture content below about 3%, by weight.

6. A method for inhibiting the shrinkage of an aqueous hydraulic cementitious system during setting and early hardening comprising selecting a dry adsorbent-like porous particulate solid material with an internal porosity in excess of 25 percent, an external void fraction above 35 percent and a surface area in excess of 100 m²/g having a volume of entrapped gas within its pores and capable of preferentially adsorbing water and discharging the entrapped gas, incorporating the particulate solid material in the cementitious system at a time no later than the addition of water thereto, and discharging the entrapped gas during setting and early hardening of the cementitious system while in contact with the water to counteract the shrinkage tendency of the cementitious system.

7. A method according to claim 6 wherein the cementitious system is one which includes pressure-calcined gypsum.

8. A method according to claim 6 wherein the cementitious system is one which sets in less then about 90 minutes and the particulate solid material is selected from the group consisting of activated alumina, activated bauxite, activated silica gel, alumino-silicate, bone char, magnesium silicate and activated carbon.

9. A method as claimed in claim 8 wherein the particulate solid material has a moisture content below about 3%, by weight.

10. A cementitious composition which, when mixed with water, is capable of setting into a hard mass without substantial shrinkage during setting and early hardening, said composition comprising a hydraulic cement mixture and an adsorbent-like porous particulate solid material having a volume of entrapped gas within its pores and capable of preferentially adsorbing water and controllably discharging the entrapped gas during setting and early hardening of said cement mixture while in contact with water, in an amount effective to counteract the shrinkage tendency of the cementitious composition.

11. A cementitious composition as claimed in claim 10 wherein said particulate solid material is selected from the group consisting of activated alumina, activated bauxite, activated carbon, activated silica gel, alumino-silicate, bone char, magnesia, and magnesium silicate.

12. A cementitious composition as claimed in claim 11 wherein the particulate solid material has a moisture content below about 3%, by weight.

13. A method for inhibiting the shrinkage of an aqueous hydraulic cementitious system during setting and early hardening comprising selecting a dry adsorbent-like porous particulate solid material from the group consisting of activated alumina, activated bauxite, activated carbon, activated silica gel, alumino-silicate, bone char, magnesia, and magnesium silicate, having a volume of entrapped gas within its pores and capable of preferentially adsorbing water and discharging the entrapped gas, incorporating the particulate solid material in the cementitious system at a time no later than the addition of water thereto, and discharging the entrapped gas during setting and early hardening of the cementitious system while in contact with the water to counteract the shrinkage tendency of the cementitious system.

14. A method according to claim 6 further including the step of selecting the size, surface properties and type of adsorbent-like porous particulate solid material so as to predetermine the speed of gas release and gas volume that will occur during setting and early hardening of the cementitious system and thus controlling the gas discharge.

* * * * *